Figure 1:
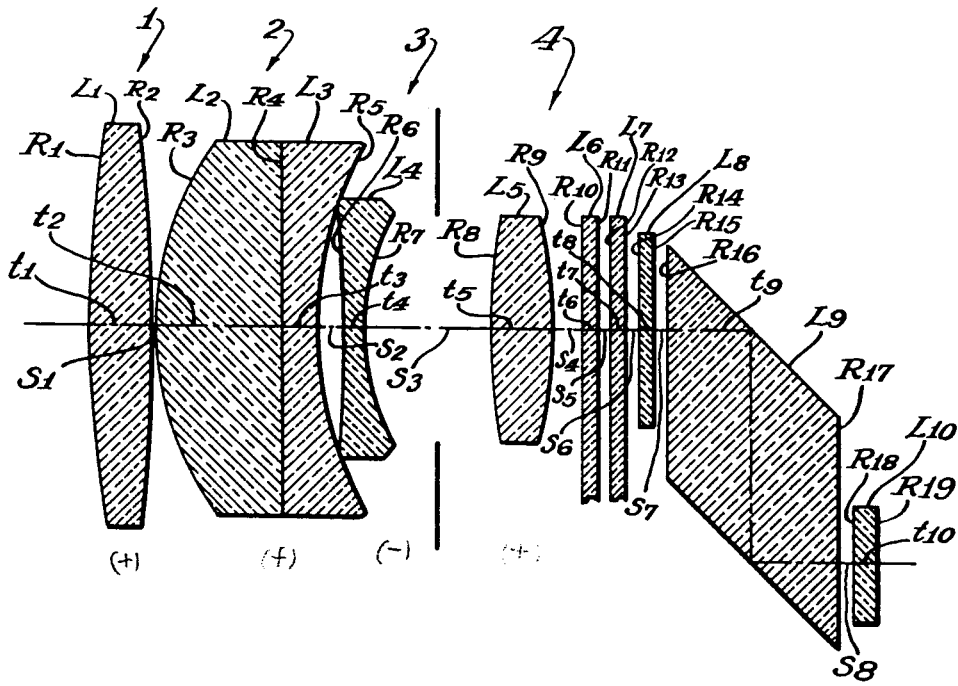

Nov. 27, 1962     W. J. JOHNSON ET AL     3,065,671
OPTICAL OBJECTIVE
Filed March 20, 1959     3 Sheets-Sheet 1

Inventors:
Walter J. Johnson
Irving C. Sandback

Nov. 27, 1962    W. J. JOHNSON ET AL    3,065,671
OPTICAL OBJECTIVE
Filed March 20, 1959    3 Sheets-Sheet 2
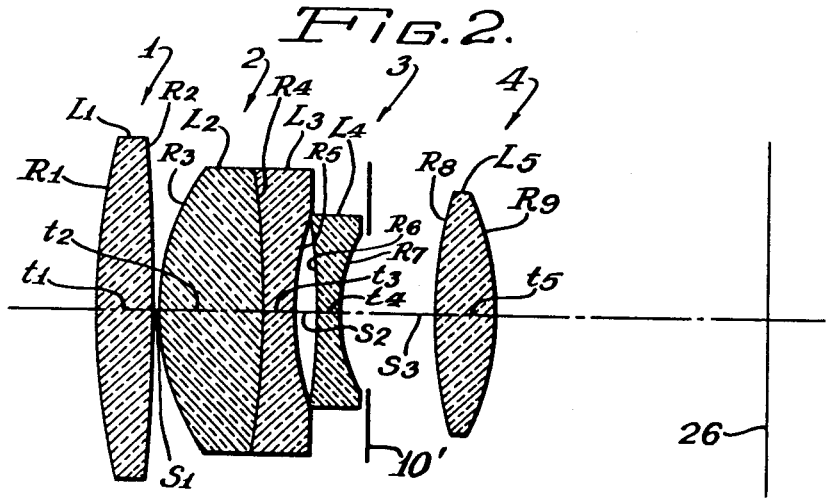
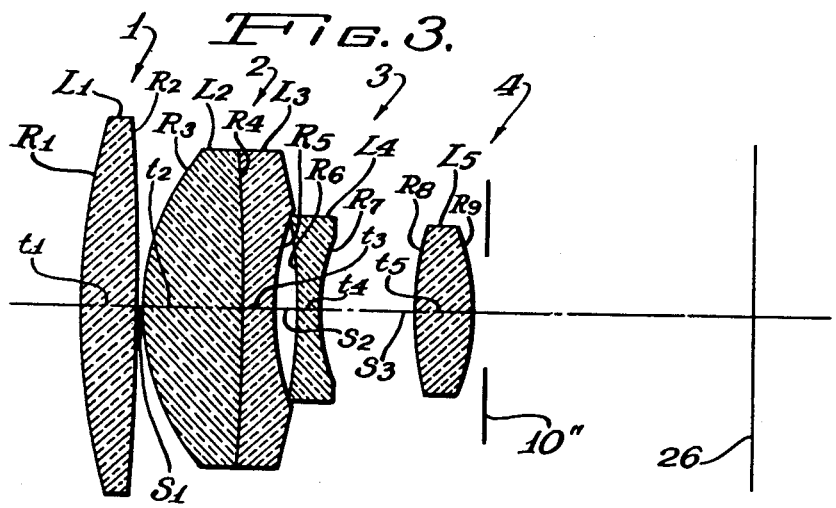
Inventors:
Walter J. Johnson
Irving C. Sandback
By Robert F. Michler, Atty.

Nov. 27, 1962   W. J. JOHNSON ET AL   3,065,671
OPTICAL OBJECTIVE
Filed March 20, 1959                   3 Sheets-Sheet 3
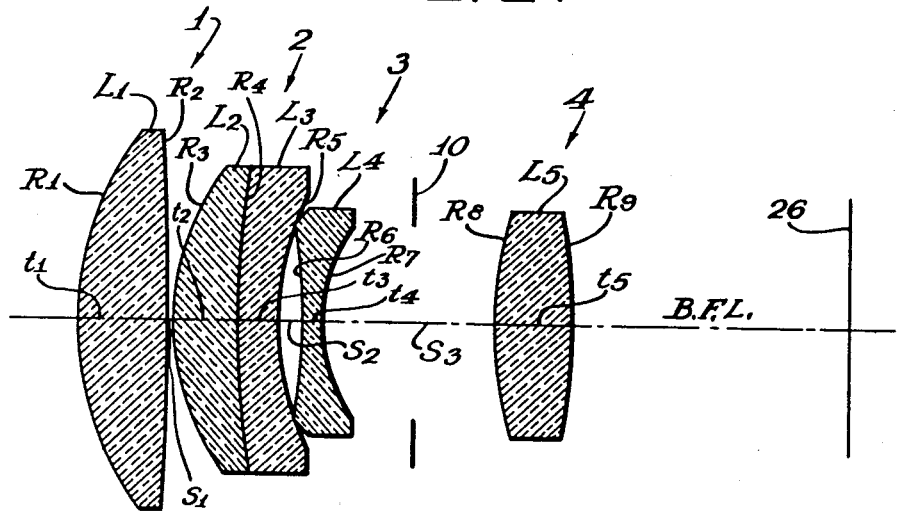
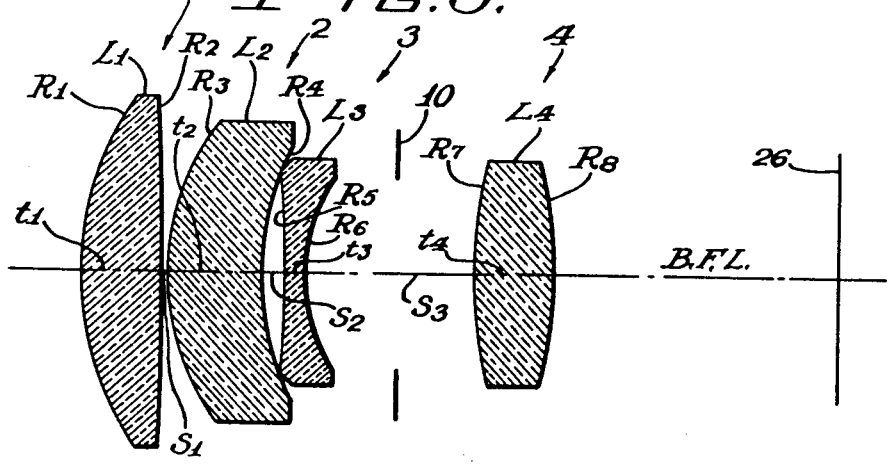
Inventors:
Walter J. Johnson
Irving C. Sandback
By Robert F. Miehle, Atty.

United States Patent Office 3,065,671
Patented Nov. 27, 1962

3,065,671
OPTICAL OBJECTIVE
Walter J. Johnson, Mundelein, and Irving C. Sandback, Morton Grove, Ill., assignors to Bell & Howell Company, Chicago, Ill., a corporation of Illinois
Filed Mar. 20, 1959, Ser. No. 800,681
5 Claims. (Cl. 88—57)

This invention relates to an optical objective, and more particularly to an optical objective primarily intended for use with a vidicon tube but readily adaptable to photographic and projection purposes, which is corrected for spherical aberration, coma, astigmatism, field curvature distortion, and chromatic aberrations.

It is an object of the invention to provide a highly corrected, large aperture objective.

Another object of the invention is to provide an optical objective in which the front component is biconvex and balances third order aberration and with a power of between 64 and 133 percent of that of the objective, a second positive meniscus component spaced closely behind the first component and having a power of between 43.5 and 76.9 percent of the overall power of the objective and the combined powers of the first and second components being between 31.3 and 35.7 percent of that of the objective, a biconcave third component closely behind the second component to balance the third order solution with a minimum addition of higher order aberrations and having a negative power of between 222 and 333 percent of that of the objective, and a fourth biconvex component separated substantially from the third component to cancel third and higher order aberrations introduced by the third component and having a power between 154 and 200 percent of that of the objective.

A further object of the invention is to provide an optical objective for a vidicon tube and optically corrected and rebalanced to accommodate glass plates in the vidicon tube system.

Another object of the invention is to provide an optical system having an external stop with corrections for the position of the stop.

A complete understanding of the invention may be obtained from the following detailed description of objectives forming specific examples thereof, when read in conjunction with the appended drawings, in which:

FIG. 1 is a longitudinal section of an objective forming one embodiment of the invention; and FIGS. 2, 3, 4 and 5 are longitudinal sections of objectives constituting modifications of the invention.

The invention provides large aperture, long back focal length, highly corrected objectives, in which three closely spaced forward components are positioned a substantial distance in front of a rear component. In one embodiment of the invention, the objective is precisely adapted for use with a vidicon tube, and, in other embodiments of the invention, the objectives are designed for precision photographic work.

In the use of the terms "front" and "rear" herein it is to be understood that reference is made to the ends of the objective respectively nearer the longer and shorter conjugates thereof.

In each objective shown in FIGS. 1 through 5, there are front, second, third and rear components 1, 2, 3 and 4, respectively. The objective of FIG. 1 is for use with and is positioned in front of a known vidicon tube $L_{10}$ having known planar optical wedges $L_6$ and $L_7$ and a planar sun protective filter $L_8$, and a known prism $L_9$ (shown schematically) therebetween. A stop is positioned at the front end of the prism $L_9$. The objective has a long back focus and the overall length from the front surface to the film approaches a high telephoto ratio. The components 1, 2, 3 and 4 are spaced closely together so as to have a short overall length and thus are quite compact. The objectives of FIGS. 2 to 5 are for use with cameras or projectors while the objective of FIG. 1 is corrected for combination with the vidicon elements.

The components 1 to 4 have lenses $L_1$ to $L_5$, radii of curvature of optical surfaces $R_1$ to $R_9$, axial thicknesses $t_1$ to $t_5$ and axial separations $s_1$ to $s_3$, while the components of the vidicon tube system are planar and are designated $L_6$ to $L_{10}$ with axial thicknesses $t_6$ to $t_{10}$ and axial separations $s_4$ to $s_8$. The lenses $L_6$ and $L_7$ are adjustable, plano and constitute a known selectively variable light filter. The plate $L_8$ is a known sun protection filter, the prism $L_9$, which is shown schematically, is of known construction and the plate $L_{10}$ is the planar glass wall of the vidicon tube.

In each of the objectives shown in FIGS. 1 to 4, the component 2 is a cemented doublet comprising lenses $L_2$ and $L_3$ with radii of curvature of the optical surfaces $R_3$ to $R_5$, while, in the objective shown in FIG. 5, the second component 2 is a singlet with only a lens $L_2$ and the numerals $L_3$, $R_4$ and $t_3$ are omitted in the portions of the description relating to the objective of FIG. 5 to correspond to this construction.

The objectives of the invention are capable of forming images with high resolution and excellent contrast, over a moderately large field of about fifty-two degrees, at a large aperture of up to $f/1.9$ or larger.

To achieve a lens of high resolution and excellent contrast over the full field requires a design of low Petzval sum and corrected higher order aberration. The relationships of this invention that contribute most to the control of the contrast and Petzval sum are as follows:

$$2.9F < f_1 + f_2 < 3.2F$$
$$.35F < t_1 + t_2 + s_3 < .50F$$
$$-.45F < f_3 < -.30F$$
$$.50F < f_4 < .65F$$
$$.72 < \frac{R_3}{R_5} < .89$$
$$0 < \frac{R_7}{R_6} < .18$$

where $f_1$ to $f_4$ are the equivalent focal lengths of the components 1 to 4, respectively, and F is the equivalent focal length of the objective.

To provide high correction, the power of the components should be distributed as follows:

$$.75F < f_1 < 1.55F$$
$$1.30F < f_2 < 2.30F$$
$$-.45F < f_3 < -.30F$$
$$.50F < f_4 < .65F$$
$$2.8F < f_1 + f_2 < 3.2F$$

In the preferred form the first component 1 is biconvex in shape, and its main function is to balance third order aberration, primarily coma and to a lesser degree spherical aberration. To effect this, the first component must satisfy the following conditions:

$$1.580 < n_d < 1.710$$
$$.45F < R_1 < 1.80F$$
$$-\infty < R_2 < -2.50F$$
$$-.75 < \frac{R_1}{R_2} < 0$$
$$.09F < t_1 < .15F$$
$$.75F < f_1 < 1.55F$$

where $n_d$ is the index of refraction for the D line of $L_1$, F the equivalent focal length of the objective, $f_1$ is the focal length of $L_1$. In terms of power, the last above inequality requires the power of the lens $L_1$ to be from 64 to 133 percent of that of the objective.

Spaced closely behind is the second component 2, which is a positive meniscus, and the power of the component 2 is determined by the first component's power, and, for high correction and compactness, satisfies the following inequalities:

$$2.8F < f_1 + f_2 < 3.2F$$
$$1.30F < f_2 < 2.30F$$

where $f_2$ is the focal length of the component 2. In terms of power, for a high degree of correction, the combined power of the objective as a whole and the power of the component 2 is between 43.5 and 76.9 percent of the power of the objective. The selection of power balance between the first and second components has a pronounced effect on the back focal length.

The second component 2 is a meniscus doublet which is shown as cemented and, of course, may be of the air separated type. The large thickness and shape of this component reduces the field curvature (Petzval sum), while the low power cemented surface controls color balance and to a lesser degree higher order spherical aberration. For high correction, the second component must satisfy the following conditions:

$$1.580 < n_d \text{ of } L_2 < 1.710$$
$$1.580 < n_d \text{ of } L_3 < 1.625$$
$$.35F < R_3 < .50F$$
$$.40F < R_5 < .60F$$
$$.72 < \frac{R_3}{R_5} < .89$$
$$.14F < t_2 + t_3 < .27F$$

Following closely behind is the third component 3, which is biconcave in shape. This component is primarily used for the balancing of the third order solution with the minimum addition of higher order aberrations. To achieve this, the component must take the following form:

$$1.685 < n_d \text{ of } L_4 < 1.755$$
$$-3.7F < R_6 < -1.9F$$
$$.23F < R_7 < .40F$$
$$0 < -\frac{R_7}{R_6} < .18$$
$$.02F < t_4 < .06F$$
$$-.45F < f_3 < -.30F$$

where $f_3$ is the focal length of $L_4$. In terms of power, for high correction, the power of the lens $L_4$ should be and is between −222 and −333 percent of the power of the objective.

The fourth or rear component 4 is biconvex, and is separated from the close coupled first three components by a relatively long air space $s_3$. The primary function of the component 4 is the cancellation of third order and higher order aberrations introduced by component 3. For high correction, the fourth component must satisfy the following conditions:

$$1.660 < n_d \text{ of } L_5 < 1.705$$
$$0.6F < R_8 < 1.1F$$
$$-1.1F < R_9 < -0.5F$$
$$.60 < -\frac{R_8}{R_9} < 1.75$$
$$.09F < t_5 < .13F$$
$$.50F < f_4 < .65F$$

where $f_4$ is the focal length of the lens $L_5$. For high correction, the power of the lens $L_5$ should be and is between 150 and 200 percent of the power of the objective.

In the objective shown in FIG. 1, the correction has been rebalanced to accommodate the elements 5 to 9 and to optimize the color correction for the specific vidicon tube application.

In FIGS. 2 to 5 there is shown large aperture objectives forming modifications of the invention which are for use as the objectives of cameras or projectors. Each of the objectives of FIGS. 2, 4 and 5 has an internal stop 10 of known construction with a focal plane 26, and the objective of FIG. 3 has a rear stop 10. The back focal length of each of these objectives is, of course, much less than that of the objective of FIG. 1 inasmuch as the objectives of FIGS. 2 to 5 are used for photographic purposes where no large number of glass elements are interposed between the objectives and the focal planes. Also, in each objective of FIGS. 2 to 5 there is no correction rebalance to accommodate glass plates since none are used therebehind. In the objectives shown in FIGS. 1 and 3 the stop or iris 10 is a rear stop and located in the short conjugate focus of objectives with these objectives corrected to correct aberrations from this location of the stop.

In the objective shown in FIG. 4, there is a pronounced increase in positive power of the power of the first component 1 with a decrease in the power of the component 2. There also is a greater negative power of the third component 3, a greater $s_3$ and a smaller $t_2$. Also, the indices of refraction of the glasses of components 1 and 2 are much less in the objective of FIG. 3 than those of the objective shown in FIG. 1, as well as a decreased back focal length and in increased telephoto effect.

The construction of the objective shown in FIG. 5 is very similar to that of the objective shown in FIG. 4 but has a meniscus singlet $L_2$ in place of the cemented doublet $L_2$ and $L_3$ of the objective of FIG. 4, the numerals $L_3$, $R_4$ and $t_3$ being omitted. The objectives of FIGS. 4 and 5 have short back foci as compared with medium length back foci of the objectives of FIGS. 2 and 3 and the long back focus of the objective of FIG. 1. Also, the objectives of FIGS. 4 and 5 each has a telephoto ratio in the region of from 1.17 to 1.29 while that of each of the objectives of FIGS. 1, 2 and 3 is about 1.29.

In preferred embodiments thereof the objectives are constructed in substantial compliance with the following tables in which the Tables I to V correspond to the respective objectives shown in FIGS. 1 to 5, dimensions are in terms of inches, $n_d$ designates the respective indices of refraction for the D line and V the Abbe dispersion numbers:

EXAMPLE I (Objective shown in FIG. 1)

[Equivalent focal length, F=2.526. Back focal length, B.F.=(from $R_9$) 1.448. Relative aperture f/2]

| Lens | R | t, s | $n_d$ | V |
|---|---|---|---|---|
| $L_1$ | $R_1 = +4.511$ | $t_1 = .245$ | $n_d = 1.700$ | $V = 47.8$ |
|  | $R_2 = -6.482$ | $s_1 = .005$ |  |  |
| $L_2$ | $R_3 = +1.215$ | $t_2 = .500$ | $n_d = 1.700$ | $V = 47.8$ |
|  | $R_4 = \infty$ |  |  |  |
| $L_3$ |  | $t_3 = .125$ | $n_d = 1.617$ | $V = 36.6$ |
|  | $R_5 = +1.460$ | $s_2 = .106$ |  |  |
|  | $R_6 = -5.364$ |  |  |  |
| $L_4$ | $R_7 = +.921$ | $t_4 = .075$ | $n_d = 1.720$ | $V = 29.3$ |
|  |  | $s_3 = .500$ |  |  |
|  | $R_8 = +2.548$ |  |  |  |
| $L_5$ | $R_9 = -1.769$ | $t_5 = .250$ | $n_d = 1.697$ | $V = 56.2$ |
|  |  | $s_4 = .104$ |  |  |
|  | $R_{10} = \infty$ |  |  |  |
| $L_6$ | $R_{11} = \infty$ | $t_6 = .0625$ | $n_d = 1.523$ | $V = 58.6$ |
|  | $R_{12} = \infty$ | $s_5 = .047$ |  |  |
| $L_7$ | $R_{13} = \infty$ | $t_7 = .0625$ | $n_d = 1.523$ | $V = 58.6$ |
|  | $R_{14} = \infty$ | $s_6 = .047$ |  |  |
| $L_8$ | $R_{15} = \infty$ | $t_8 = .0625$ | $n_d = 1.523$ | $V = 58.6$ |
|  | $R_{16} = \infty$ | $s_7 = .047$ |  |  |
| $L_9$ | $R_{17} = \infty$ | $t_9 = 1.550$ | $n_d = 1.620$ | $V = 60.3$ |
|  | $R_{18} = \infty$ | $s_8 = .0625$ |  |  |
| $L_{10}$ | $R_{19} = \infty$ | $t_{10} = .093$ (Focal Plane) | $n_d = 1.523$ | $V = 58.6$ |

EXAMPLE II (Objective shown in FIG. 2)

[Equivalent focal length, F=1.000. Back focal length, B.F.=.528. Relative aperture f/1.9]

| Lens | R | t, s | $n_d$ | V |
|---|---|---|---|---|
| $L_1$ | $R_1 = +1.353$ | $t_1 = .117$ | $n_d = 1.651$ | $V = 55.8$ |
|  | $R_2 = -3.333$ | $s_1 = .0015$ |  |  |
| $L_2$ | $R_3 = +.435$ | $t_2 = .200$ | $n_d = 1.651$ | $V = 55.8$ |
|  | $R_4 = -1.800$ |  |  |  |
| $L_3$ | $R_5 = +.573$ | $t_3 = .060$ | $n_d = 1.605$ | $V = 38.0$ |
|  | $R_6 = -2.138$ | $s_2 = .032$ |  |  |
|  | $R_7 = +.297$ | $t_4 = .051$ | $n_d = 1.720$ | $V = 29.3$ |
| $L_4$ |  | $s_3 = .190$ |  |  |
|  | $R_8 = +.925$ | $t_5 = .110$ | $n_d = 1.671$ | $V = 52.0$ |
| $L_5$ | $R_9 = -.550$ |  |  |  |

EXAMPLE III (Objective shown in FIG. 3)

[Equivalent focal length, F=1.000. Back focal length, B.F.=.543. Relative aperture f/2.5]

| Lens | R | t, s | $n_d$ | V |
|---|---|---|---|---|
| $L_1$ | $R_1 = +1.250$ | $t_1 = .110$ | $n_d = 1.697$ | $V = 56.2$ |
|  | $R_2 = -6.270$ | $s_1 = .002$ |  |  |
| $L_2$ | $R_3 = +.475$ | $t_2 = .198$ | $n_d = 1.697$ | $V = 56.2$ |
|  | $R_4 = -7.115$ |  |  |  |
| $L_3$ | $R_5 = +.568$ | $t_3 = .060$ | $n_d = 1.605$ | $V = 43.4$ |
|  | $R_6 = -2.085$ | $s_2 = .034$ |  |  |
| $L_4$ | $R_7 = +.325$ | $t_4 = .050$ | $n_d = 1.720$ | $V = 29.3$ |
|  |  | $s_3 = .190$ |  |  |
| $L_5$ | $R_8 = +.957$ | $t_5 = .110$ | $n_d = 1.697$ | $V = 56.2$ |
|  | $R_9 = -.599$ |  |  |  |

EXAMPLE IV (Objective Shown in FIG. 4)

[Equivalent focal length, F=2.500. Back focal length, B.F.=1.076. Relative aperture f/1.9]

| Lens | R | t, s | $n_d$ | V |
|---|---|---|---|---|
| $L_1$ | $R_1 = +1.204$ | $t_1 = .343$ | $n_d = 1.589$ | $V = 61.0$ |
|  | $R_2 = -66.303$ | $s_1 = .005$ |  |  |
| $L_2$ | $R_3 = +.940$ | $t_2 = .250$ | $n_d = 1.589$ | $V = 61.0$ |
|  | $R_4 = +8.336$ |  |  |  |
| $L_3$ | $R_5 = +1.125$ | $t_3 = .150$ | $n_d = 1.584$ | $V = 46.0$ |
|  | $R_6 = -7.115$ | $s_2 = .086$ |  |  |
| $L_4$ | $R_7 = +.650$ | $t_4 = .075$ | $n_d = 1.720$ | $V = 29.3$ |
|  |  | $s_3 = .625$ |  |  |
| $L_5$ | $R_8 = +1.664$ | $t_5 = .300$ | $n_d = 1.694$ | $V = 53.5$ |
|  | $R_9 = -2.548$ |  |  |  |

EXAMPLE V (Objective Shown in FIG. 5)

[Equivalent focal length, F=2.500. Back focal length, B.F.=1.128. Relative aperture f/2]

| Lens | R | t, s | $n_d$ | V |
|---|---|---|---|---|
| $L_1$ | $R_1 = +1.173$ | $t_1 = .320$ | $n_d = 1.589$ | $V = 61.0$ |
|  | $R_2 = -25.039$ | $s_1 = .005$ |  |  |
| $L_2$ | $R_3 = +.934$ | $t_2 = .367$ | $n_d = 1.589$ | $V = 61.0$ |
|  | $R_4 = +1.125$ |  |  |  |
| $L_3$ | $R_5 = -6.182$ | $t_3 = .086$ |  |  |
|  | $R_6 = +.657$ | $t_4 = .075$ | $n_d = 1.720$ | $V = 29.3$ |
| $L_4$ |  | $s_3 = .651$ |  |  |
|  | $R_7 = +1.834$ | $t_5 = .300$ | $n_d = 1.694$ | $V = 53.5$ |
| $L_5$ | $R_8 = -2.383$ |  |  |  |

While the invention is thus described, it is not wished to be limited to the precise details described, as changes may be readily made without departing from the spirit of the invention.

What is claimed is:

1. In an optical objective, first, second, third and fourth components arranged in that order, and being further characterized in that the objective is constructed in substantial compliance with the following table in which dimensions are in terms of inches and beginning with front end of the objective $L_1$ to $L_{10}$ designate the lenses $R_1$ to $R_{19}$ the respective radii of curvature of the surfaces, $t_1$ to $t_9$ the axial thicknesses, $s_1$ to $s_8$ the axial separations, $n_d$ the indices of refraction for the D line and V the Abbe dispersion numbers:

Equivalent focal length=2.526. Back focal length=(from $R_9$) 1.448. Aperture f/2]

| | | | | |
|---|---|---|---|---|
| $L_1$ | $R_1 = +4.511$ | $t_1 = .245$ | $n_d = 1.700$ | $V = 47.8$ |
| | $R_2 = -6.482$ | $s_1 = .005$ | | |
| $L_2$ | $R_3 = +1.215$ | $t_2 = .500$ | $n_d = 1.700$ | $V = 47.8$ |
| | $R_4 = \infty$ | | | |
| $L_3$ | $R_5 = +1.460$ | $t_3 = .125$ | $n_d = 1.617$ | $V = 36.6$ |
| | $R_6 = -5.364$ | $s_2 = .106$ | | |
| $L_4$ | $R_7 = +.921$ | $t_4 = .075$ | $n_d = 1.720$ | $V = 29.3$ |
| | $R_8 = +2.548$ | $s_3 = .500$ | | |
| $L_5$ | $R_9 = -1.769$ | $t_5 = .250$ | $n_d = 1.697$ | $V = 56.2$ |
| | $R_{10} = \infty$ | $s_4 = .104$ | | |
| $L_6$ | $R_{11} = \infty$ | $t_6 = .0625$ | $n_d = 1.532$ | $V = 58.6$ |
| | $R_{12} = \infty$ | $s_5 = .047$ | | |
| $L_7$ | $R_{13} = \infty$ | $t_7 = .0625$ | $n_d = 1.523$ | $V = 58.6$ |
| | $R_{14} = \infty$ | $s_6 = .047$ | | |
| $L_8$ | $R_{15} = \infty$ | $t_8 = .0625$ | $n_d = 1.523$ | $V = 58.6$ |
| | $R_{16} = \infty$ | $s_7 = .047$ | | |
| $L_9$ | $R_{17} = \infty$ | $t_9 = 1.550$ | $n_d = 1.620$ | $V = 60.3$ |
| | $R_{18} = \infty$ | $s_8 = .0625$ | | |
| $L_{10}$ | $R_{19} = \infty$ | $t_{10} = .093$ (Focal Plane) | $n_d = 1.523$ | $V = 58.6$ |

2. In an optical objective, first, second, third and fourth components arranged in that order, the first, second and third components being closely grouped, and being further characterized in that the objective is constructed in substantial compliance with the following table in which dimensions are in terms of inches and beginning with the front end of the objective $L_1$ and $L_5$ designate the lenses $R_1$ to $R_9$ the respective radii of curvature of the surfaces, $t_1$ to $t_5$ the axial thicknesses, $s_1$ to $s_3$ the axial separations, $n_d$ the indicies of refraction for the D line and V the Abbe dispersion numbers:

[Equivalent focal length=1.000. Back focal length=.528. Aperture f/19]

| | | | | |
|---|---|---|---|---|
| $L_1$ | $R_1 = +1.353$ | $t_1 = .117$ | $n_d = 1.651$ | $V = 55.8$ |
| | $R_2 = -3.333$ | $s = .0015$ | | |
| $L_2$ | $R_3 = -.435$ | $t_2 = .200$ | $n_d = 1.651$ | $V = 55.8$ |
| | $R_4 = -1.800$ | | | |
| $L_3$ | $R_5 = +.573$ | $t_3 = .060$ | $n_d = 1.605$ | $V = 38.0$ |
| | $R_6 = -2.138$ | $s_2 = .032$ | | |
| $L_4$ | $R_7 = +.297$ | $t_4 = .051$ | $n_d = 1.720$ | $V = 29.3$ |
| | $R_8 = +.925$ | $s_3 = .190$ | | |
| $L_5$ | $R_9 = -.550$ | $t_5 = .110$ | $n_d = 1.671$ | $V = 52.0$ |

3. In an optical objective, first, second, third and fourth components arranged in that order, and being further characterized in that the objective is constructed in substantial compliance with the following table in which, beginning with the front end of the objective $L_1$ to $L_5$ designate the lenses, $R_1$ to $R_9$ the respective radii of curvature of the surfaces, $t_1$ to $t_5$ the axial thicknesses, $s_1$ to $s_3$ the axial separations, $n_d$ the indices of refraction for the D line and V the Abbe dispersion numbers:

[Equivalent focal length=1.000. Back focal length=.543. Aperture f/2.5]

| | | | | |
|---|---|---|---|---|
| $L_1$ | $R_1 = +1.250$ | $t_1 = .110$ | $n_d = 1.697$ | $V = 56.2$ |
| | $R_2 = -6.270$ | $s_1 = .002$ | | |
| $L_2$ | $R_3 = +.475$ | $t_2 = .198$ | $n_d = 1.697$ | $V = 56.2$ |
| | $R_4 = -7.115$ | | | |
| $L_3$ | $R_5 = +.568$ | $t_3 = .060$ | $n_d = 1.605$ | $V = 43.4$ |
| | $R_6 = -2.085$ | $s_2 = .034$ | | |
| $L_4$ | $R_7 = +.325$ | $t_4 = .050$ | $n_d = 1.720$ | $V = 29.3$ |
| | $R_8 = +.957$ | $s_3 = .190$ | | |
| $L_5$ | $R_9 = -.599$ | $t_5 = .110$ | $n_d = 1.697$ | $V = 56.2$ |

4. In an optical objective, first, second, third and fourth components arranged in that order, and being further characterized in that the objective is constructed in substantial compliance with the following table in which, beginning with the front end of the objective $L_1$ to $L_5$ designate the lenses, $R_1$ to $R_9$ the respective radii of curvature of the surfaces, $t_1$ to $t_5$ the axial thicknesses, $s_1$ to $s_3$ the axial separations, $n_d$ the indices of refraction for the D line and V the Abbe dispersion numbers:

[Equivalent focal length=2.500. Back focal length=1.076. Aperture f/1.9]

| | | | | |
|---|---|---|---|---|
| $L_1$ | $R_1 = +1.204$ | $t_1 = .343$ | $n_d = 1.589$ | $V = 61.0$ |
| | $R_2 = -66.303$ | $s_1 = .005$ | | |
| $L_2$ | $R_3 = +.940$ | $t_2 = .250$ | $n_d = 1.589$ | $V = 61.0$ |
| | $R_4 = +8.336$ | | | |
| $L_3$ | $R_5 = +1.125$ | $t_3 = .150$ | $n_d = 1.584$ | $V = 46.0$ |
| | $R_6 = -7.115$ | $s_2 = .086$ | | |
| $L_4$ | $R_7 = +.650$ | $t_4 = .075$ | $n_d = 1.720$ | $V = 29.3$ |
| | $R_8 = +1.664$ | $s_3 = .625$ | | |
| $L_5$ | $R_9 = -2.548$ | $t_5 = .300$ | $n_d = 1.694$ | $V = 53.5$ |

5. In an optical objective, first, second, third and fourth components arranged in that order, the first, second and third components being closely grouped, the second component being a positive meniscus singlet, and being further characterized in that the objective is constructed in substantial compliance with the following table in which dimensions are in terms of inches, and beginning with the front end of the objective, $L_1$, $L_2$, $L_4$ and $L_5$ designate the lenses, $R_1$, $R_2$, $R_3$, $R_4$, $R_5$, $R_6$, $R_7$ and $R_8$ the respective radii of curvature of the surfaces, $t_1$, $t_2$, $t_4$ and $t_5$ the axial thicknesses, $s_1$ to $s_3$ the axial separation, $n_d$ the indices of refraction for the D line and V the Abbe dispersion numbers:

[Equivalent focal length=2.500. Back focal length=1.128. Aperture f/2]

| | | | | |
|---|---|---|---|---|
| $L_1$ | $R_1 = +1.173$ | $t_1 = .320$ | $n_d = 1.589$ | $V = 61.0$ |
| | $R_2 = -25.039$ | $s_1 = .005$ | | |
| $L_2$ | $R_3 = +.934$ | $t_2 = .367$ | $n_d = 1.589$ | $V = 61.0$ |
| | $R_4 = +1.125$ | | | |
| $L_3$ | $R_5 = -6.182$ | $t_4 = .075$ | $n_d = 1.720$ | $V = 29.3$ |
| | $R_6 = +.657$ | $s_3 = .651$ | | |
| $L_4$ | $R_7 = +1.834$ | $t_5 = .300$ | $n_d = 1.694$ | $V = 53.5$ |
| | $R_8 = -2.383$ | | | |

(References on following page)

References Cited in the file of this patent

UNITED STATES PATENTS

| | | |
|---|---|---|
| 1,584,271 | Bertele | May 11, 1926 |
| 2,170,428 | Richter | Aug. 22, 1939 |
| 2,352,026 | Smejkal | June 20, 1944 |
| 2,399,858 | Cox | May 7, 1946 |
| 2,416,443 | Grey | Feb. 25, 1947 |
| 2,441,036 | Schade | May 4, 1948 |
| 2,541,014 | Orser | Feb. 13, 1951 |
| 2,600,208 | Cook | June 10, 1952 |

FOREIGN PATENTS

| | | |
|---|---|---|
| 103,802 | Austria | July 26, 1926 |
| 538,653 | Great Britain | Aug. 12, 1941 |